United States Patent Office 3,500,038
Patented Mar. 10, 1970

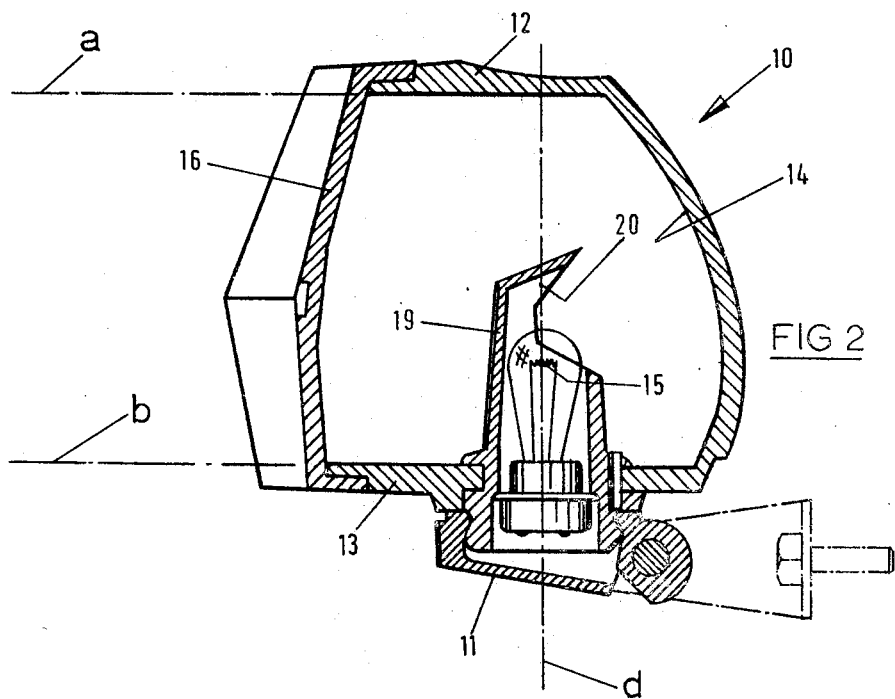

3,500,038
AUXILIARY LAMPS FOR MOTOR VEHICLES
David W. Neale, Stourport, England, assignor to Raydyot Limited, Stafford, England, a British company
Filed July 3, 1967, Ser. No. 650,987
Claims priority, application Great Britain, Aug. 24, 1966, 37,909/66
Int. Cl. F21v *13/04, 7/00*
U.S. Cl. 240—41.3                                3 Claims

ABSTRACT OF THE DISCLOSURE

A vehicle lamp having a body, a lens over the open end thereof and a light source disposed between the body and lens and towards the bottom of the body. The inner surface of the rear wall of the body is shaped and treated to form a parabolic reflector. The body also has a pair of forwardly extending parallel planar surfaces which are nonreflective. The light source is surrounded by a shield which is apertured to permit emission of light towards the reflector only. The shield extends through the bottom surface of the body and the exterior surface of the shield is shaped to form a mount for an attachment device which is used for mounting the lamp on a vehicle.

---

Figure 1:
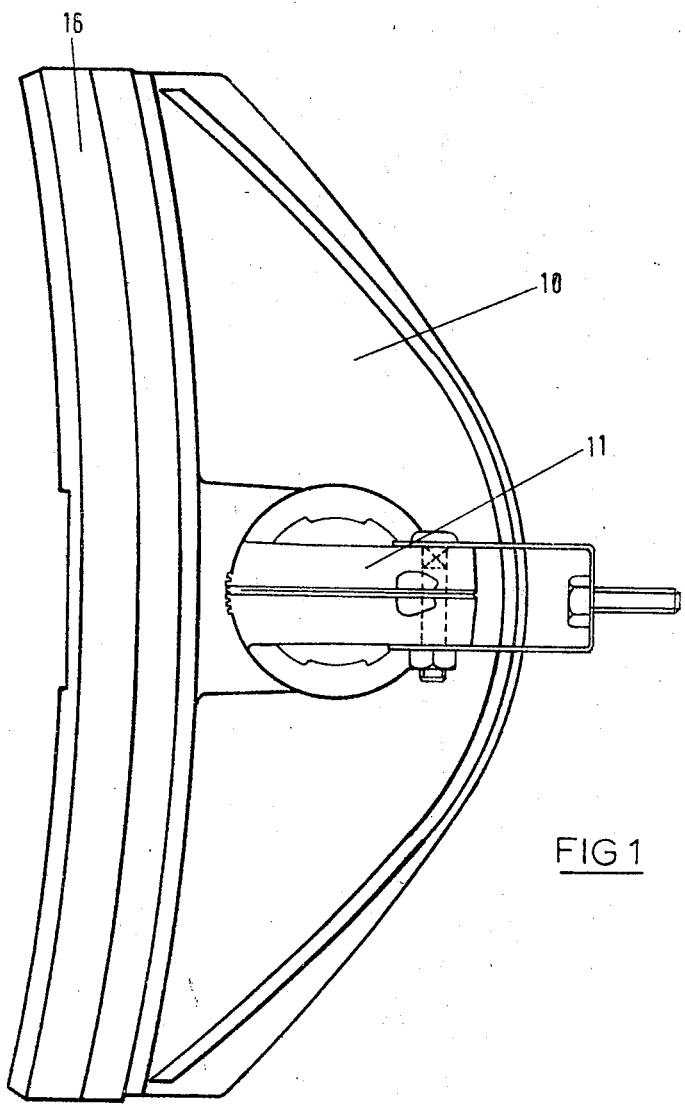

This invention relates to auxilary lamps for motor vehicles, for example fog lamps, driving lamps and the like, and the object of the invention is to provide an improved lamp having a particularly efficient beam shaping and directing means.

In accordance with the invention, considered broadly, a vehicle auxiliary lamp has a reflector located behind the light source and extending between the top and bottom of the lamp, and a lens in front of the light source, said reflector being substantially parabolic in at least the vertical plane with said source disposed at the focus of the parabola and located substantially nearer to said bottom of the lamp than to the said top of the lamp.

Preferably, the lamp reflector is parabolic in two directions, i.e., in the horizontal plane as well as the vertical plane, but it is not necessarily a paraboloid of revolution, since it may be desired to produce a beam of generally elliptical cross-section.

Preferably, also the lamp body includes parallel upper and lower walls which are blackened or rendered matt to avoid stray reflections.

One application of the invention is now more particularly described with reference to the accompanying drawings in which:

FIGURE 1 is an underside plan view of a lamp; and
FIGURE 2 is a sectional elevation thereof;

The lamp shown in the drawing comprises a body 10 and a bracket 11, which are interconnected.

The body has parallel flat upper and lower parts 12, 13 and integral therewith, a rear, part 14 of parabolic shape: the focal point or centre of the parabola is the light source 15 which is illustrated as a conventional prefocus lamp bulb but may equally and possibly preferably be an iodine quartz type lamp bulb (in which case the envelope about the filament would be of different shape).

The interior surface 14 of the body is bright and reflective for example by plating or vapour deposition.

The lamp body is closed by a lens 16 which may exert a modifying effect on the light beam to assist in cutoff of stray rays.

The lamp bulb is housed in a shield 19 which is ported at 20 to allow transmission of rays therethrough and the interior of the shield is nonreflective.

The filament or source 15 is seen to be in the lower part of the body. The result is a beam extending between the lines *a*, *b* which is generally parallel.

In plan view, the reflector 14 is also parabolic giving a divergent beam, so that when mounted with the axis of the bulb vertical, i.e., with line *d* vertical, on the front of the vehicle, the beam is spread fan wise across the road.

I claim:
1. A vehicle auxiliary lamp comprising a lamp body having a rear wall shaped so that its inner surface is substantially parabolic in at least the vertical plane and is rendered reflective to form a reflector, said surface being formed integrally with nonreflecting planar top and bottom surfaces extending respectively from opposite free edges of the body in parallel relationship, a lens covering the open end of the body, a light source disposed between the reflector and lens at the focus of the parabola and located substantially nearer to said bottom surface than to said top surface, and a shield surrounding said light source and being apertured to permit emission of light only in a direction towards said reflector.

2. A lamp as claimed in claim 1, wherein the shield extends through the bottom surface of the body, the exterior portion being shaped to form mounting means for an attachment device whereby the lamp is mountable on a vehicle.

3. A lamp as claimed in claim 1, wherein the shield comprises, above the bottom surface, a hollow generally cylindrical tube having a nonreflective inner surface and being apertured in its face adjacent to the reflector, the lower end portion of the tube having a wall of increased thickness extending through the body, said thicker wall having a peripheral groove within which the body is secured and forming a bead at its outer end over which attached means for mounting the lamp on a vehicle.

References Cited

UNITED STATES PATENTS

| 1,496,779 | 6/1924 | Landahl et al. | 240—41.35 |
| 1,663,177 | 3/1928 | Reynolds | 240—46.55 |
| 3,032,649 | 5/1962 | Radford | 240—41.1 |
| 3,167,258 | 1/1965 | Wilde | 240—41.3 |

FOREIGN PATENTS

| 1,068,922 | 2/1954 | France. |
| 256,473 | 8/1926 | Great Britain. |
| 377,246 | 7/1932 | Great Britain. |
| 1,074,458 | 7/1967 | Great Britain. |

NORTON ANSHER, Primary Examiner
R. P. GREINER, Assistant Examiner

U.S. Cl. X.R.
240—103, 41.35, 41.1